No. 878,621. PATENTED FEB. 11, 1908.
W. ENGELBRECHT.
FEED REGULATOR.
APPLICATION FILED OCT. 31, 1904.

Witnesses
Ernest Pulsford
C. B. McBath

Inventor
W. Engelbrecht,
By Shuard Brock
Attorneys

UNITED STATES PATENT OFFICE.

WILLIAM ENGELBRECHT, OF CISSNA PARK, ILLINOIS.

FEED-REGULATOR.

No. 878,621.  Specification of Letters Patent.  Patented Feb. 11, 1908.

Application filed October 31, 1904. Serial No. 230,742.

*To all whom it may concern:*

Be it known that I, WILLIAM ENGELBRECHT, a citizen of the United States, residing at Cissna Park, in the county of Iroquois and the State of Illinois, have invented a new and useful Feed-Regulator, of which the following is a specification.

This invention relates to a feed hopper designed to let the feed gradually flow into the trough or manger thereby preventing too rapid eating on the part of the stock. An objection to devices of this character heretofore introduced has been that with an opening of small size the flow of grain would become impaired, or entirely stopped by the presence of straw or the like in the feed, while a larger opening would permit too rapid a flow and thus defeat the object of the invention. I overcome this objectionable feature by providing a spring moved by the tip of the nose or lips of the animal and which automatically stirs the feed and prevents clogging of the lower end of the feed hopper.

Figure 1:
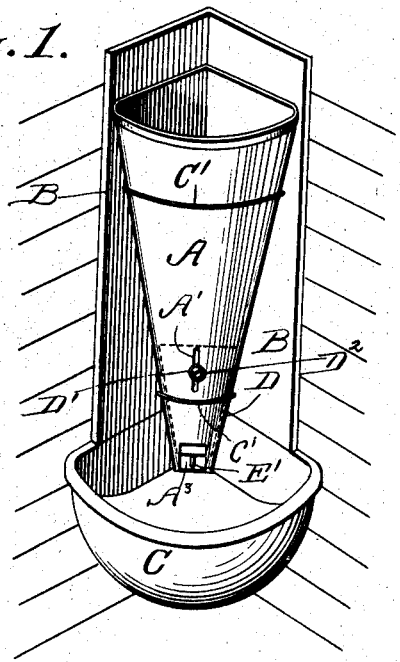
Figure 2:
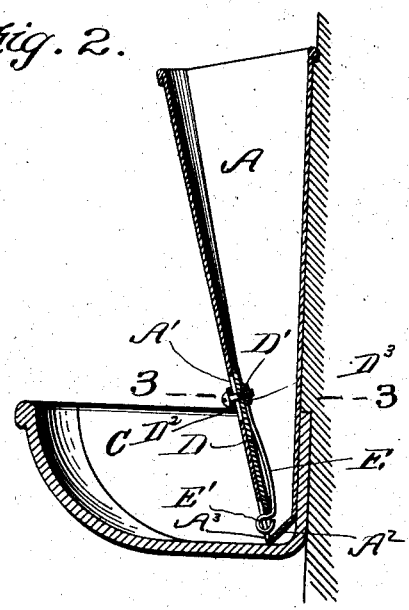
Figure 3:
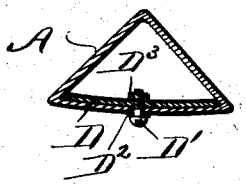
Figure 4:
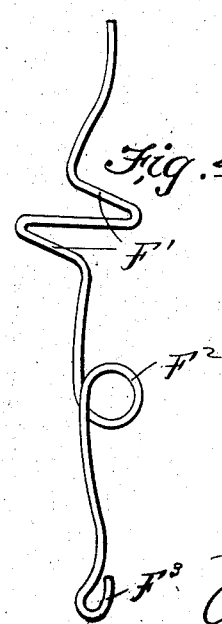

My invention consists of the novel combination of parts and construction hereafter described, pointed out in the claims and shown in the accompanying drawings, in which:

Figure 1 is a perspective view showing my device in position. Fig. 2 is a vertical section. Fig. 3 is a section on the line 3—3 of Fig. 2. Fig. 4 is a detail view of a spring.

In these drawings A, represents a hopper preferably triangular in cross section and having downwardly converging sides. Its front face is provided with a vertical slot A'. It is adapted to be secured to boards B, arranged vertically and at right angles to each other, but may be secured in any desired manner, and the hopper A, has a forwardly inclined bottom A², and on the front is cut away at A³, to form a discharge opening. The hopper rests upon the bottom of the feed trough C, and may be secured by wires C', as shown in Fig. 1. A plate D, fits snugly within the hopper against its front wall, being wedge shaped, as shown in dotted lines in Fig. 1, and extends approximately to the side walls of the hopper so that as they are converging walls, it cannot be displaced and forced inward. A screw or adjustable bolt D', works through the plate and opening A', being provided with a suitable washer D², in advance and a nut D³, soldered to the rear of the plate D. In the form shown in Fig. 2, a leaf spring is secured, as by soldering to the plate D, below the nut D³, and extends downwardly, having a bent curled portion E', projecting through the opening A³, and adapted to be engaged by the lips of the animal in eating.

In operation the plate D, is adjusted so that the opening A³ will be of a sufficient size to permit the flow of feed to be at the desired rate. As the animal eats the spring E, or any of its various forms, will be agitated by the lips of the animal and will keep the feed stirred in the lower portion of the hopper and prevent clogging, thus maintaining a regular flow of the grain.

Having thus fully described my invention, what I claim as new and desire to secure by Letters Patent is:—

1. A device of the kind described comprising a hopper having a discharge opening, a plate arranged in said hopper, a spring secured to said plate within the hopper and projecting through the said opening, and means for regulating the said plate.

2. A device of the kind described comprising a hopper having a discharge opening, a plate slidably mounted in said hopper and a spring secured to said plate at one end in the hopper and having its free end curved and projected through the discharge opening.

3. A device of the kind described comprising a hopper having a discharge opening in its front face adjacent its lower end, a plate slidably mounted above said opening an elastic agitating member secured to said plate within the hopper above the opening and extending downwardly and projecting through the opening, and means for adjusting the slidable plate adapted to vary the size of the opening.

4. A device of the kind described comprising a hopper having downwardly converging side walls and triangular in cross section, said hopper having a forwardly inclined bottom, a discharge opening adjacent the bottom and a vertical slot above the opening, an adjustable plate adapted to slide vertically on the inner face of the front wall of the hopper and vary the size of the opening, a set screw working through the slot adapted to clamp the plate in its adjusted position, and a spring secured at one end to said plate in the hopper and projecting through the discharge opening, as and for the purpose set forth.

WILLIAM ENGELBRECHT.

Witnesses:
GEORG SINN,
R. C. AMSLER.